(12) United States Patent
Kim et al.

(10) Patent No.: US 12,353,789 B2
(45) Date of Patent: Jul. 8, 2025

(54) ELECTRONIC DEVICE, AND AUDIO OUTPUT MODE CONFIGURATION METHOD ACCORDING TO CONNECTION TO PLURALITY OF AUDIO OUTPUT DEVICES

(71) Applicant: Samsung Electronics Co., Ltd., Suwon-si (KR)

(72) Inventors: Heejin Kim, Suwon-si (KR); Ochae Kwon, Suwon-si (KR); Myoungwoo Nam, Suwon-si (KR); Inje Hwang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 209 days.

(21) Appl. No.: 18/143,985

(22) Filed: May 5, 2023

(65) Prior Publication Data

US 2023/0273763 A1    Aug. 31, 2023

Related U.S. Application Data

(63) Continuation of application No. PCT/KR2021/016142, filed on Nov. 8, 2021.

(30) Foreign Application Priority Data

Nov. 6, 2020 (KR) .......................... 10-2020-0147635

(51) Int. Cl.
  *H04R 5/02*  (2006.01)
  *G06F 3/16*  (2006.01)
  *H04R 1/10*  (2006.01)

(52) U.S. Cl.
  CPC .............. *G06F 3/162* (2013.01); *G06F 3/165* (2013.01)

(58) Field of Classification Search
  CPC ................................. G06F 3/162; G06F 3/165
  (Continued)

(56) References Cited

U.S. PATENT DOCUMENTS 9,820,323 B1  11/2017  Young et al.
10,362,402 B2  7/2019  Jaisimha et al.
(Continued)

FOREIGN PATENT DOCUMENTS

EP    3668070 A2   6/2020
JP    5085431 B2   11/2012
(Continued)

OTHER PUBLICATIONS

International Search Report and Written Opinion for International Application No. PCT/KR2021/016142; International Filing Date Nov. 8, 2021; Date of Mailing Feb. 17, 2022; 51 Pages.

(Continued)

*Primary Examiner* — Ammar T Hamid
(74) *Attorney, Agent, or Firm* — CANTOR COLBURN LLP

(57) ABSTRACT

An electronic device comprises an audio interface, a communication module, a processor, and a memory operatively connected to the processor, wherein the memory can store instructions configured so that, during the execution thereof, the processor: receives a request for connection to a second audio output device while connected to first audio output device through the audio interface and/or the communication module; identifies the types of the first audio output device and the second audio output device to automatically select one simultaneous output method suitable for the first audio output device and the second audio output device from among various simultaneous output methods, if the device types are the same as each other, and thus configures an output path corresponding to the selected simultaneous (Continued)

output method; and repeats the operation of reconfiguring the output path whenever a third audio output device is connected through the audio interface and/or the communication module.

15 Claims, 10 Drawing Sheets

(58) Field of Classification Search
USPC .................................................. 381/307, 74
See application file for complete search history.

(56) References Cited

U.S. PATENT DOCUMENTS

| | | |
|---|---|---|
| 10,524,300 B2 | 12/2019 | Ueda et al. |
| 11,210,056 B2 | 12/2021 | Jung et al. |
| 2007/0211907 A1 | 9/2007 | Eo et al. |
| 2010/0150383 A1 | 6/2010 | Sampat |
| 2014/0047487 A1 | 2/2014 | Guedalia et al. |
| 2015/0256926 A1 | 9/2015 | Kim et al. |
| 2016/0056782 A1 | 2/2016 | Lee |
| 2017/0048619 A1 | 2/2017 | Bang et al. |
| 2017/0078824 A1 | 3/2017 | Heo |
| 2018/0176688 A1 | 6/2018 | Baek et al. |
| 2020/0092641 A1 | 3/2020 | Smus et al. |
| 2020/0382569 A1* | 12/2020 | Fornshell .............. H04L 65/611 |

FOREIGN PATENT DOCUMENTS

| | | |
|---|---|---|
| KR | 100754210 B1 | 9/2007 |
| KR | 100790147 B1 | 1/2008 |
| KR | 101013712 B1 | 2/2011 |
| KR | 20110099725 A | 9/2011 |
| KR | 20110115126 A | 10/2011 |
| KR | 20150104371 A | 9/2015 |
| KR | 20160023166 A | 3/2016 |
| KR | 101645903 B1 | 8/2016 |
| KR | 20170062853 A | 6/2017 |
| KR | 101782980 B1 | 9/2017 |
| KR | 20200124948 A | 11/2020 |
| WO | 2019066520 A2 | 4/2019 |

OTHER PUBLICATIONS

Korean Office Action corresponding to Application No. 119981042713; Dated Apr. 8, 2025.

* cited by examiner

ELECTRONIC DEVICE, AND AUDIO OUTPUT MODE CONFIGURATION METHOD ACCORDING TO CONNECTION TO PLURALITY OF AUDIO OUTPUT DEVICES

CROSS-REFERENCE TO RELATED APPLICATION(S)

This application is a continuation application, claiming priority under § 365(c), of International Application No. PCT/KR2021/016142 filed on Nov. 8, 2021, which is based on and claims the benefit of Korean patent application number 10-2020-0147635 filed on Nov. 6, 2020, in the Korean Intellectual Property Office, the disclosures of which are incorporated by reference herein in their entireties.

TECHNICAL FIELD

Various embodiments relate to an electronic device and a method of configuring an audio output mode according to connections with a plurality of audio output devices.

BACKGROUND ART

An electronic device provides various functions, and an audio function is one of the functions which users may use. The electronic device may output audio data through wired earphones, an internal speaker, a Bluetooth device, and various wired audio output devices. A recent electronic device may support a function of outputting an audio signal by interworking with a plurality of audio output devices in order to support a stereoscopic sound effect.

DISCLOSURE OF INVENTION

Technical Problem

When a user desires to switch to a simultaneous output mode through a plurality of audio output devices connected to an electronic device, entering a user setting menu and making a configuration may be cumbersome. Further, the user may have inconvenience in that audio output devices for simultaneous output should be selected whenever a new audio output device is connected to the electronic device or information on audio output devices which do not support simultaneous output cannot be identified.

Solution to Problem

According to various embodiments, an electronic device comprises an audio interface, a communication module, a processor, and a memory operatively connected to the processor, wherein the memory can store instructions configured so that, during the execution thereof, the processor: receives a request for connection to a second audio output device while connected to first audio output device through the audio interface and/or the communication module; identifies the types of the first audio output device and the second audio output device to automatically select one simultaneous output method suitable for the first audio output device and the second audio output device from among various simultaneous output methods, if the device types are the same as each other, and thus configures an output path corresponding to the selected simultaneous output method; and repeats the operation of reconfiguring the output path whenever a third audio output device is connected through the audio interface and/or the communication module.

According to various embodiments a method of configuring an audio output mode by an electronic device comprises receiving a request for a connection with a second audio output device through at least one of the audio interface and the communication module during a connection with a first audio output device, identifying types of the first audio output device and the second audio output device; and responsive to determining that the types of the first audio output device and the second audio output device are equal to each other, automatically selecting one simultaneous output scheme corresponding to the first audio output device and the second audio output device from among various simultaneous output schemes, configuring an output path according to the selected simultaneous output scheme, and reproducing audio data, wherein the configuring of the output path comprises repeating the configuring of the output path whenever a third audio output device is connected through at least one of the audio interface and the communication module.

Advantageous Effects of Invention

An electronic device according to various embodiments can identify the same device type among the connected audio output devices in the state in which a plurality of audio output devices are connected to output an audio signal, automatically select a simultaneous output scheme suitable for the types of the audio output devices, and change an output path for simultaneous output.

An electronic device according to various embodiments can make a reconfiguration such that a simultaneous output scheme corresponding to types of audio output devices varies depending on a situation without outputting an audio signal to the last connected audio output device whenever a new audio output device is connected.

MODE FOR THE INVENTION

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

Figure 1:
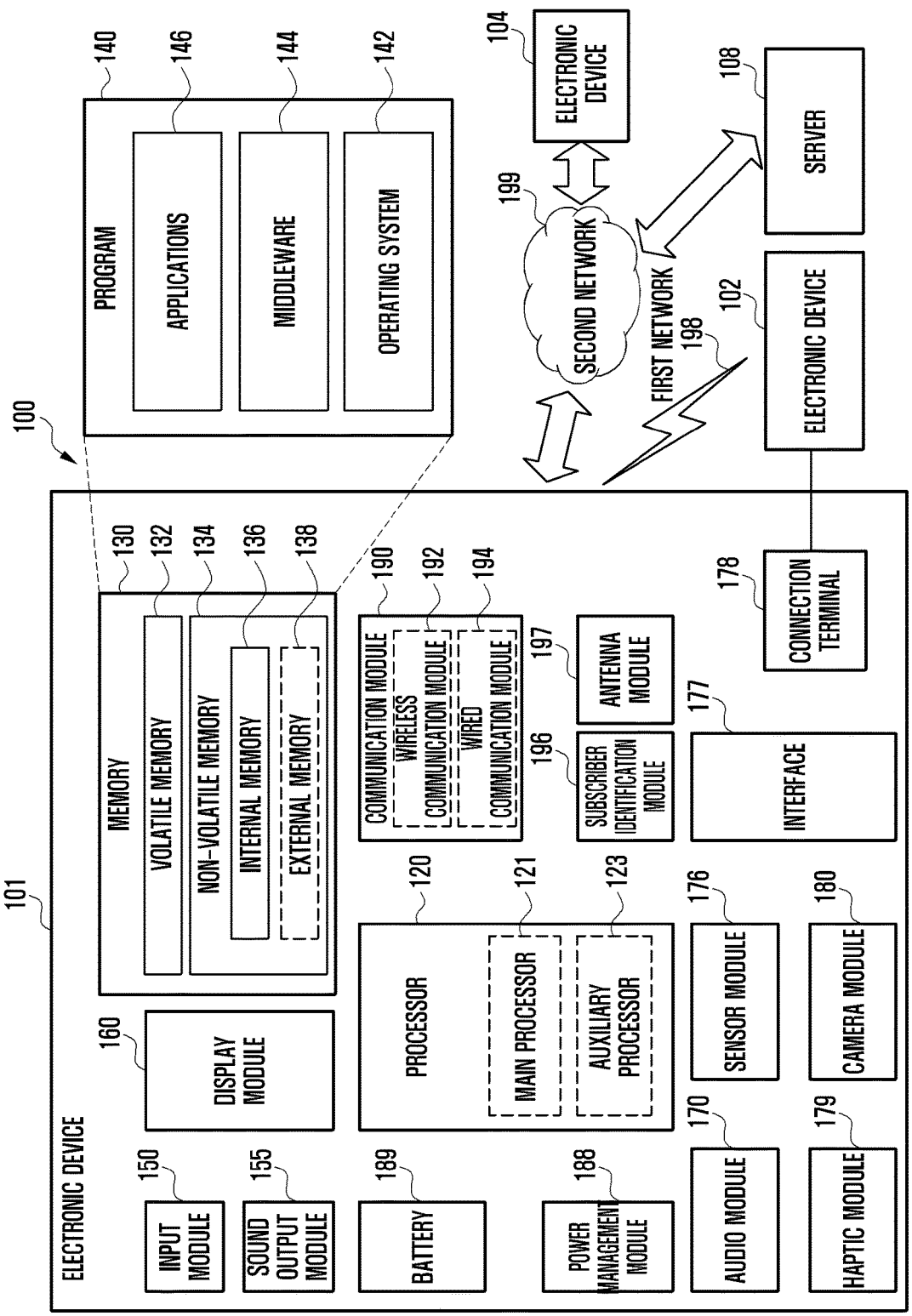
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MWI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
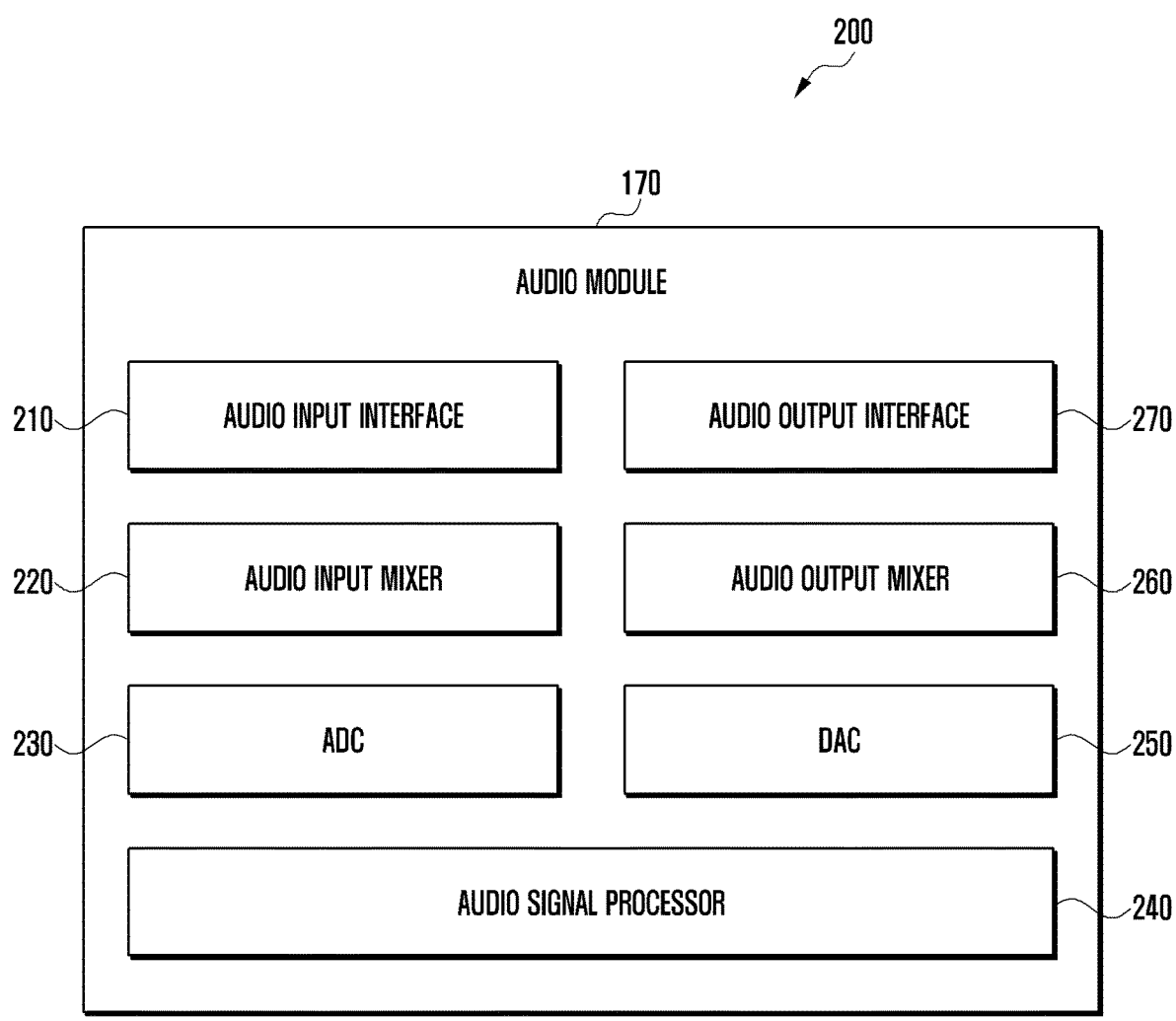
FIG. 2 is a block diagram illustrating the audio module according to various embodiments.

FIG. 2 is a block diagram 200 illustrating the audio module 170 according to various embodiments. Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input module 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor (120) or the memory (130)) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output module 155. The sound output module 155 may include, for example, a speaker, such as a dynamic driver or a balanced armature driver, or a receiver. According to an embodiment, the sound output module 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

Figure 3:
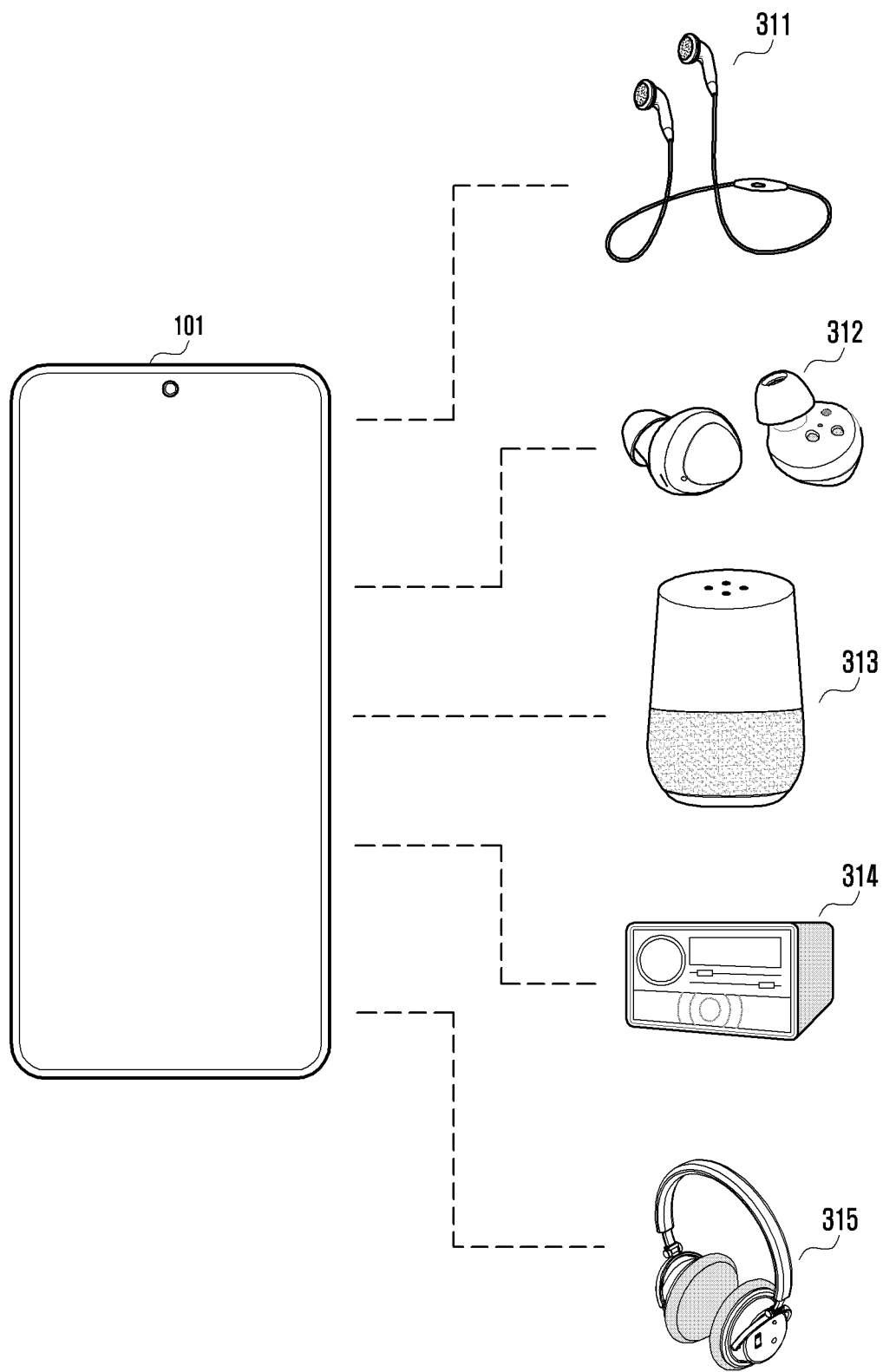
FIG. 3 illustrates the connection relation between an electronic device and a plurality of audio output devices according to various embodiments.

FIG. 3 illustrates the connection relation between an electronic device and a plurality of audio output devices according to various embodiments.

Referring to FIG. 3, the electronic device 101 according to an embodiment may support connections with a plurality of audio output devices 311, 312, 313, 314, and 315. In connection with audio reproduction, the electronic device 101 may support a single output mode or a simultaneous output mode. The electronic device 101 may include an internal speaker (not shown). The electronic device 101 may be connected to one or more of the audio output devices such as wired earphones, wireless earphones, a Wi-Fi speaker, a Bluetooth device, and an external wired speaker device. Each audio output device may be connected to the electronic device 101 through a wire or wirelessly, and may output or reproduce an audio signal transmitted from the electronic device 101.

In the single output mode, the electronic device 101 may be configured to output an audio signal to one audio output device (e.g., one of the plurality of audio output devices 311, 312, 313, 314, and 315). For example, when insertion of the wired earphones is detected in the state in which an audio signal is configured to be output to the internal speaker, the electronic device 101 in the single output mode may switch an output path to output the audio signal to the wired earphones.

According to an embodiment, even though the electronic device 101 in the single output mode is connected to a plurality of audio output devices, the electronic device 101 may output (or transfer) or transmit the audio signal to one audio output device which is connected last. For example, when the connection with a Bluetooth speaker device (e.g., the audio output device 313) is made during the connection with the wired earphones (e.g., the audio output device 311), the electronic device 101 may switch the output path and output the audio signal to the Bluetooth speaker device from the wired earphones.

According to an embodiment, the electronic device 101 in the single output mode may be configured to output the audio signal to one audio output device selected by the user.

The electronic device 101 according to an embodiment may support the simultaneous output mode of simultaneously outputting the audio signal to at least two audio output devices (e.g., two of the plurality of audio output devices 311, 312, 313, 314, and 315). The electronic device 101 may be configured to output the audio signal to the audio output device designated by the user selection.

According to an embodiment, in the simultaneous output mode, the electronic device 101 may determine whether there are the identical device type of devices among the connected audio output devices, identify the type of the same devices, automatically select an optimized simultaneous output scheme in accordance with the type of the same devices, and configure an output path through the determined simultaneous output scheme. For example, a first audio output device 311 may be wired earphones, a second audio output device 312 may be wireless earphones, a third audio output device 313 and a fourth audio output device 314 may be Bluetooth devices, and a fifth audio output device 315 may be a wireless headset. The electronic device 101 may identify the first audio output device 311, the second audio output device 312, the fifth audio output device 315 as a headset type and identify the third audio output device 313 and the fourth audio output device 314 as a speaker type.

According to an embodiment, the electronic device 101 may repeatedly perform an operation of automatically reselecting and reconfiguring the simultaneous output scheme when a new audio output device is connected or in every content reproduction request.

Hereinafter, a method of automatically controlling the simultaneous output mode is described.

A method of configuring an audio output mode is described.

Figure 4:
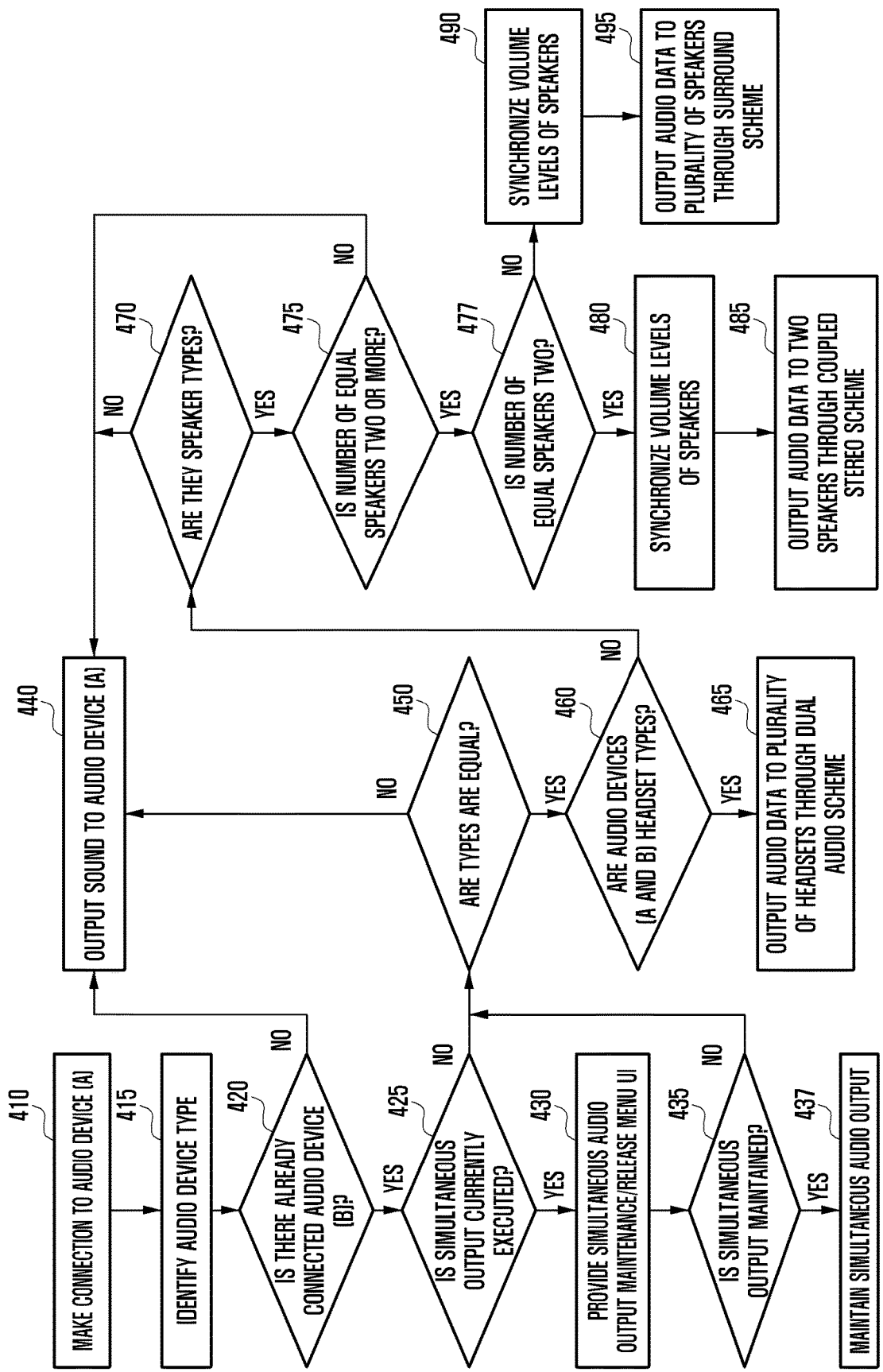
FIG. 4 illustrates a method of configuring an audio output mode corresponding to connections of a plurality of audio output devices according to various embodiments.

Referring to FIG. 4, a processor (for example, the processor 120 of FIG. 1) of the electronic device 101 according to an embodiment may detect the connection with an audio output device (A) in operation 410.

For example, when the audio output device (A) inserts into a jack interface on the basis of a change in a voltage value by access to an audio jack plug, the processor 120 may detect the connection with the audio output device (A). Alternatively, when a communication link with the audio output device (A) is established through a wireless communication circuit, the processor 120 may detect the connection with the audio output device (A).

In operation 415, the processor 120 may identify a type of the audio output device (A).

According to an embodiment, the processor 120 may exchange profile information with the audio output device (A). The profile information may include a device identifier (for example, a vendor identification (VID) indicating manufacturer information), a product identification (PID) indicating a product, a device name, or additional information. The processor 120 may identify the type of the audio output device (A) on the basis of the device identifier or the device name.

According to some embodiments, the electronic device 101 may support an item for configuring or selecting the type of the audio output device (A). The user may configure or select the type of the connected audio output device (A). The processor 120 may identify the type of the audio output device (A) connected to the electronic device 101 on the basis of the configured (or selected) item.

In operation 420, the processor 120 may determine whether there is an audio output device (B) already connected to the electronic device 101.

Hereinafter, for convenience of description, the audio output device (B) already connected to the electronic device is referred to as a first audio output device and the audio output device (A) connected newly or later in operation 410 is referred to as a second audio output device.

When there is no already connected first audio output device (B), the processor 120 may output audio data through the connected second audio output device (A). For example, the processor 120 may configure an output path (for example, change the output from the internal speaker to the audio output device) to output the audio data to the connected second audio output device (A).

When there is the already connected first audio output device (B), the processor 120 may proceed to operation 425 and determine whether the simultaneous output function is currently executed.

When the simultaneous output function is currently executed, the processor 120 may proceed to operation 430 and output a simultaneous output maintenance/release menu user interface (UI) on the display. For example, the simultaneous output maintenance/release menu UI may be output through a popup window, but is not limited thereto. When the user does not desire the simultaneous output to the first audio output device (B) and the second audio output device (A), the user may select a simultaneous output release item. Alternatively, when the user desires to maintain the current simultaneous output (for example, when the user executes the simultaneous output to another audio device C instead of the already connected audio device B), the user may select an OK (or maintenance) item to maintain the simultaneous output.

The simultaneous output function is a mode for supporting the simultaneous audio output to at least two audio output devices and may support at least one of, for example, a dual audio scheme, a coupled stereo scheme, or a surround output scheme.

When the simultaneous output function is not currently executed in operation 425, the processor 120 may proceed to operation 450 and determine whether types of the already connected first audio output device (B) and the later connected second audio output device (A) are the same as each other.

In operation 435, the processor 120 may identify whether the user selects the simultaneous output maintenance. When the simultaneous output maintenance is selected, the processor 120 may proceed to operation 437. According to an embodiment, the processor 120 may maintain the simultaneous output configuration set before the connection of the second audio device (A) by the user in operation 437.

The processor 120 may proceed to operation 450 on the basis of an input of not maintaining the currently executed simultaneous output by the user and determine whether the types of the connected first audio output device (B) and the later connected second audio output device (A) are the same as each other.

According to some embodiments, operation 425, operation 430, operation 435, and operation 437 may be omitted, and when the operations are omitted, the processor 120 may proceed to operation 450 from operation 420 and perform a series of processes of automatically selecting an optimized output scheme according to the types of the first audio output device (B) and the second audio output device (A).

In operation 450, the processor 120 may identify whether the types of the first audio output device (B) and the second audio output device (A) are the same as each other. When the types of the first audio output device (B) and the second audio output device (A) are not the same, the processor 120 may proceed to operation 440 and output audio data through the last (or later) connected second audio output device (A). For example, the processor 120 may switch a signal output path to the first audio output device (B) to a signal output path to the second audio output device (A).

When the types of the first audio output device (B) and the second audio output device (A) are the same as each other, the processor 120 may identify whether the identical device type is a headset type in operation 460.

When it is identified that the same device type is the headset type, the processor 120 may select a dual audio scheme from among the simultaneous output schemes in operation 465. The dual audio scheme may be a scheme of copying the audio data (for example, sound source) and outputting the audio data to each of the connected headset devices.

When the same device type is not the headset type, the processor 120 may proceed to operation 470 and identify whether the types of the first audio output device (B) and the second audio output device (A) are a speaker type.

When the types of the first audio output device (B) and the second audio output device (A) are neither the headset type nor the speaker type, the processor 120 may proceed to operation 440 and configure an output path to output audio data through the last (or later) connected second audio output device (A).

When the types of the first audio output device (B) and the second audio output device (A) are the speaker type, the processor 120 may proceed to operation 475 and identify whether the number of same speakers is two or more.

According to some embodiments, the processor 120 may classify speakers having similar outputs/tones as the same speaker group. For example, the processor 120 may store list information for classifying speaker groups in a memory or acquire the list information from a server, and may identify a speaker group having similar outputs/tones on the basis of the list information.

When the number of same speakers is smaller than 2, the processor 120 may proceed to operation 440 and configure an output path to output audio data through the last (or later) connected second audio output device (A).

When the processor 120 may determine whether the number of same speakers is 2 in operation 477 and, when the same speakers are 2, may synchronize volume levels of the two speakers in operation 480 and output audio data through the coupled stereo scheme among the simultaneous output schemes in operation 485. When the first audio output device (B) and the second audio output device (A) are configured as the same speaker, the processor 120 may configure the coupled stereo scheme in the simultaneous output schemes. The coupled stereo scheme may be a scheme for dividing an audio signal into two channels, outputting a right (R) channel signal to a first device, and outputting a left (L) channel signal to a second device.

When the number of speakers connected through the first audio output device (B) and the second audio output device (A) is three or more, which exceeds two, the processor 120 may synchronize volume levels of the speakers in operation 490 and output audio data through the surround output scheme in operation 495. The surround output scheme may be a scheme for outputting an audio signal to multiple channels (for example, channel 5.1 and channel 7.1) by using the respective connected speaker devices. For example, the audio output device may be an audio output device having a multi-channel speaker.

According to an embodiment, when the simultaneous output scheme is configured, the processor 120 may control the volume levels of the first audio output device (B) and the second audio output device (A) to be the same when content is reproduced. For example, the processor 120 may control the volume of the later connected second audio output device (A) to fit the volume level of the first audio output device (B) or may identify the volume performance difference between the first audio output device (B) and the second audio output device (A) and perform control to simultaneously output average volume levels.

Figure 5:
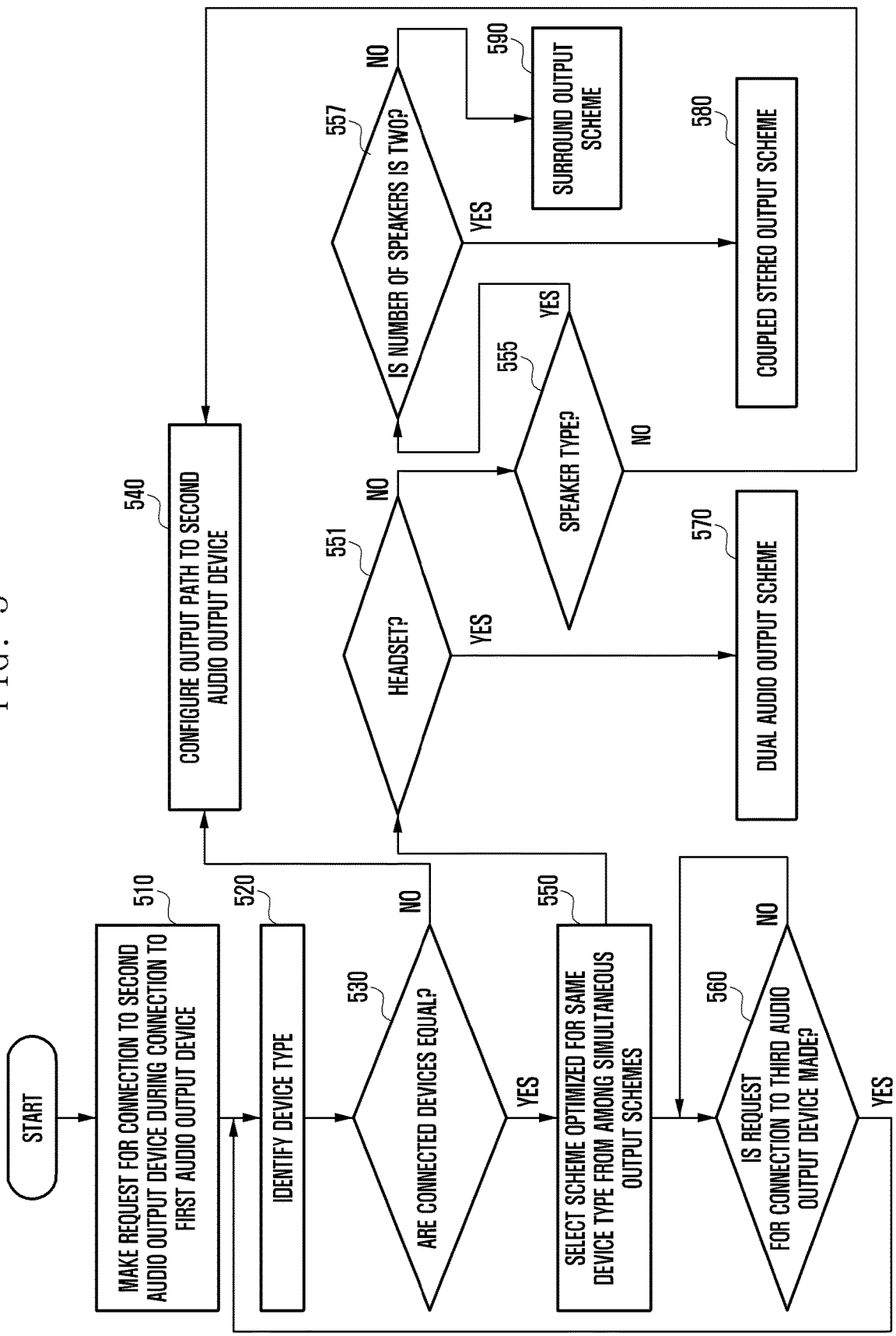
FIG. 5 illustrates a method of configuring an audio output mode corresponding to connections of a plurality of audio output devices according to various embodiments.

FIG. 5 illustrates a method of configuring an audio output mode corresponding to connections of a plurality of audio output devices according to various embodiments.

Referring to FIG. 5, a processor (for example, the processor 120 of FIG. 1) of the electronic device 101 according to an embodiment may detect a request for a connection with a second audio output device (for example, the second audio output device (A) of FIG. 4) in the state in which the electronic device is connected to a first audio output device (for example, the first audio output device (B) of FIG. 4) in operation 510. The processor 120 may be connected to the second audio output device (A) with which the connection is requested.

According to an embodiment, the electronic device 101 may search for an external audio output device through wireless communication and receive a signal making a request for the connection with the external audio output device. Alternatively, the electronic device 101 may search for an external audio device on the basis of a user input of selecting a simultaneous output device in a speaker setting menu or a function setting menu and receive a signal making a request for the connection with the external audio output device. Alternatively, the electronic device 101 may detect insertion of wired earphones/headset or a wired speaker device through an interface.

In operation 520, the processor 120 may identify types of the first audio output device (B) and the second audio output device (A). According to an embodiment, the processor 120 may exchange profile information with the connected audio output devices (for example, the first audio output device (B) and the second audio output device (A)). For example, the profile information may include a device identifier (for example, a vendor identification (VID) indicating manufacturer information), a product identification (PID) indicating a product, a device name, or additional information.

In operation 530, the processor 120 may determine whether the connected audio output devices (for example, the first audio output device (B) and the second audio output device (A)) are the same type. The processor 120 may determine whether there is the identical device type among the connected audio output devices on the basis of device identifiers or device names.

When the connected audio output devices (for example, the first audio output device (B) and the second audio output device (A)) are not the same type, the processor 120 may output audio data to the last connected second audio output device (A) in operation 540. For example, the processor 120 may switch a signal output path to the first audio output device (B) to a signal output path to the second audio output device (A).

When the connected audio output devices (for example, the first audio output device (B) and the second audio output device (A)) correspond to the same device type, the processor 120 may automatically select an optimized simultaneous output scheme in accordance with the identical device type in operation 550. The simultaneous output scheme may be one of a dual audio scheme, a coupled stereo scheme, or a surround output scheme. The processor 120 may change an output path (or output configuration) to output audio data in the automatically selected simultaneous output scheme through the connected audio output devices.

In addition, according to some embodiments, the processor 120 may identify types of the first audio output device (B) and the second audio output device (A) and, when the types of the first audio output device (B) and the second audio output device (A) are the same type, output a simultaneous output configuration/release menu UI or guide information for enabling the simultaneous output mode on the display. When the number of connected audio output devices which are the identical device type is at least two, the electronic device 101 may provide the simultaneous output configuration/release menu UI or the guide information for enabling the simultaneous output mode, so as to support the user to configure/release the simultaneous output mode.

Illustrative operations of operation 550 of automatically selecting the simultaneous output scheme may proceed to operation 551. According to an embodiment, in operation 551, the processor 120 may identify whether the same device type of the audio output devices connected in operation 510 is a headset type.

When the same device type is the headset type in operation 551, the processor 120 may select the dual audio scheme from among the simultaneous output schemes. The dual audio scheme may be a scheme of copying the audio data (for example, sound source) and outputting the audio data to each of the connected headset devices.

When the types of the first audio output device (B) and the second audio output device (A) are not the headset type, the processor 120 may identify whether the types are a speaker type in operation 555. When the types of the first audio output device (B) and the second audio output device (A) are neither the headset type nor the speaker type, the processor 120 may proceed to operation 540 and configure an output path to output audio data through the last connected second audio output device (A).

When the same device type is the speaker type, the processor 120 may determine the number of speakers connected to the electronic device 101 is two in operation 557.

When the number of connected speakers is two, the processor 120 may select the coupled stereo scheme to output audio data through the two speakers among the simultaneous output schemes in operation 580. The coupled stereo scheme may be a scheme for dividing an audio signal into two channels, outputting a right (R) channel signal to a first device, and outputting a left (L) channel signal to a second device.

For example, the processor 120 may configure a signal path such that an audio signal is divided into two channels, a right (R) channel signal is output to the first audio output device (B), and a left (L) channel signal is output to the second audio output device (A).

When the number of connected speakers is larger than two (or is three or more), the processor 120 may select the surround output scheme to output audio data through the connected speakers among the simultaneous output schemes in operation 590. The surround output scheme may be a scheme for outputting an audio signal to multiple channels (for example, channel 5.1 and channel 7.1) by using the respective connected speaker devices.

According to an embodiment, when the simultaneous output scheme is configured, the processor 120 may control the volume levels of the first audio output device (B) and the second audio output device (A) to be the same when content is reproduced. For example, the processor 120 may control the volume of the later connected second audio output device (A) to fit the volume level of the first audio output device (B) or may identify the volume performance difference between the first audio output device (B) and the second audio output device (A) and perform control to simultaneously output average volume levels.

The processor 120 may determine whether there is a request for a connection with a new third audio output device in operation 560 and, when the new audio output device is connected, proceed to operation 520 to repeatedly perform operation 520 to operation 550. When the new third audio output device is not connected, the processor 120 may maintain operation 550.

Figure 6:
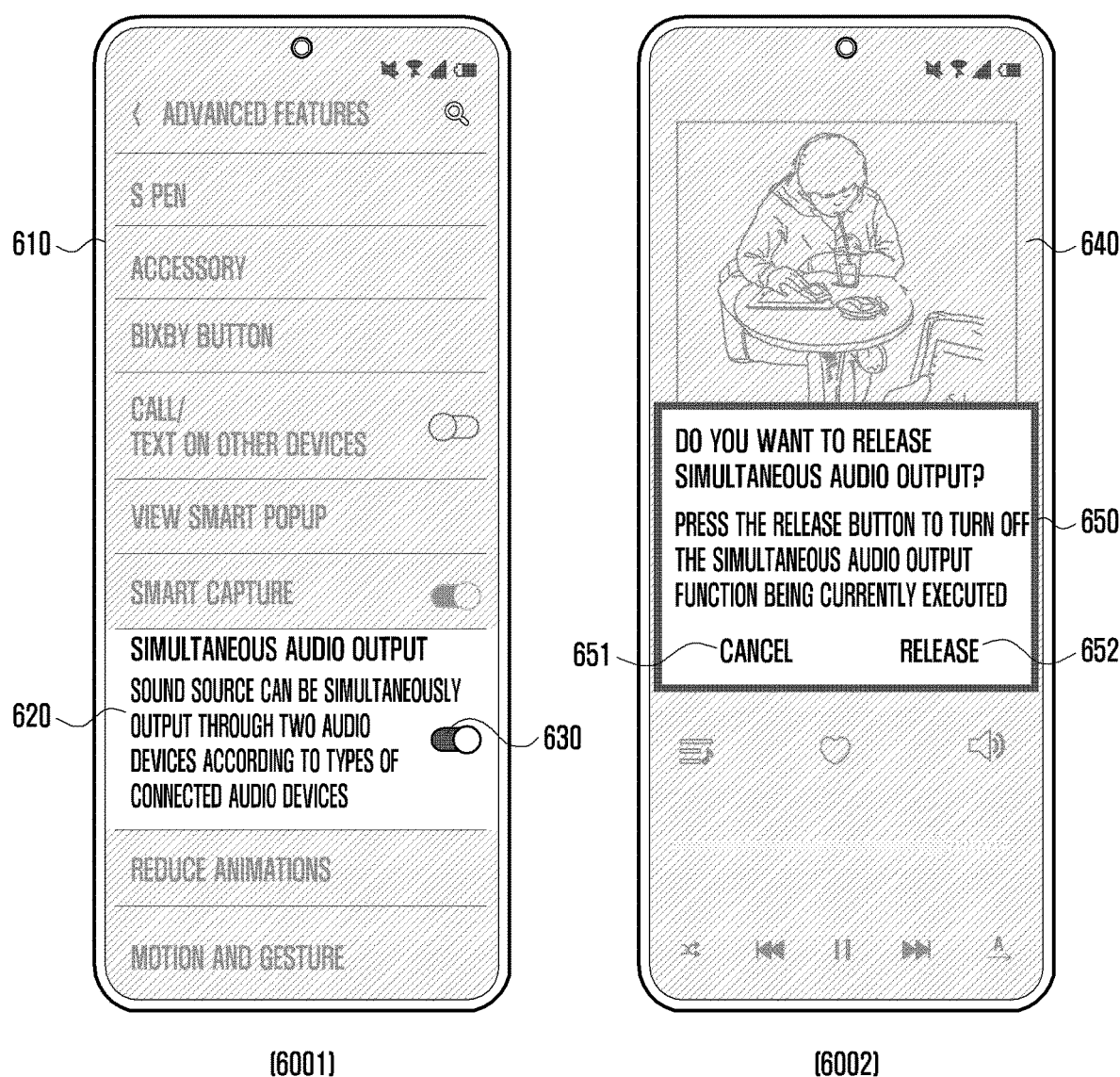
FIG. 6 illustrates user interface screens related to the simultaneous output mode according to various embodiments.

FIG. 6 illustrates user interface screens related to the simultaneous output mode according to various embodiments.

Referring to FIG. 6, the electronic device 101 according to an embodiment may provide a menu UI for releasing/configuring the simultaneous output mode.

According to an embodiment, the electronic device 101 may support maintenance/release of a simultaneous output function in a function configuration option menu. For example, as indicated by reference numeral 6001, a function configuration menu screen 610 may be displayed in response to a request for entering a function configuration menu from the user. The function configuration menu screen 610 may include a simultaneous audio output item 620 and an on/off switch item 630. The user may maintain/release (e.g., enable/disable) the simultaneous audio output function by using the on/off switch item 630.

In addition, although not illustrated in the drawings, when configuring the simultaneous output mode, the electronic device 101 may support a function of automatically or manually configuring the simultaneous output scheme.

According to an embodiment, when the simultaneous audio output function is selected to be on and configured (or activated) in the function configuration menu screen 610, the electronic device 101 may adaptively vary the simultaneous output scheme according to types of the audio output devices connected through the operations in FIG. 4 and FIG. 5.

According to an embodiment, when content is reproduced, the electronic device 101 may support a user interface for supporting maintenance and release of the configuration of the simultaneous output mode. According to an embodiment, when the simultaneous output mode is configured and content is reproduced, the electronic device 101 may output guide information 650 for turning off the simultaneous output function in a content reproduction screen 640 as indicated by reference numeral 6002. The guide information 650 may include simultaneous output release guide information, a configuration maintenance item 651, and a release item 652, but is not limited thereto.

According to another embodiment, the electronic device 101 may provide the user with information indicating that connected audio output devices are plural in the state in which the single output mode is configured and the simultaneous output mode is possible at a time point at which the identical device type of devices exists among the connected audio output devices or a time point at which content is reproduced and a configuration item of the simultaneous output function.

According to an embodiment, the electronic device 101 may output the guidance of the configuration of the simultaneous output mode in the form of a popup window, but the present disclosure is not so limited. According to some embodiments, the electronic device 101 may provide an icon indicating possibility of the simultaneous output mode in an indicator area.

Figure 7:
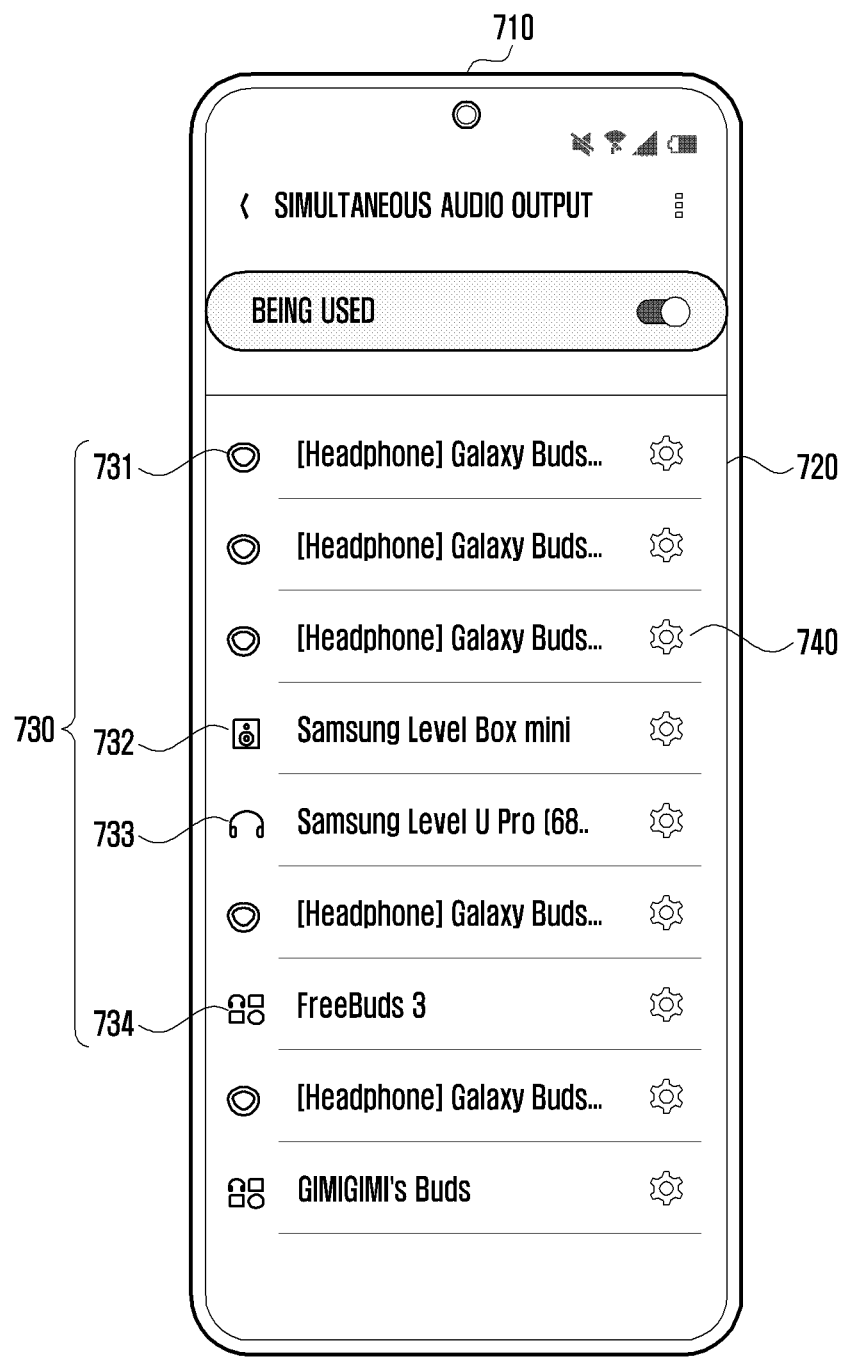
FIG. 7 illustrates a user interface screen related to the simultaneous output mode according to various embodiments.

FIG. 7 illustrates a user interface screen related to the simultaneous output mode according to various embodiments.

Referring to FIG. 7, the electronic device 101 according to an embodiment may be connected to a plurality of audio output devices through a wire or wirelessly, and may support a function of displaying an audio output device list on the display in order to support a simultaneous audio output function.

For example, the electronic device 101 may display an audio output device list UI 710 connected to the electronic device 101 in response to entry into a simultaneous audio output function menu. The audio output device list UI 710 may include an audio output device model name 720, a device type icon 730 indicating an audio output device type, and a change configuration item 740 supporting a change in the device type and the name.

The user may check/identify an audio output device connected to the electronic device 101 and a device type through the audio output device list UI 710 and select an audio output device for operating the simultaneous output mode. For example, the user may identify that the connected audio output devices are classified into an earphone type 731, a speaker type 732, and a headset type 733, and also an unidentified type 734. The user may select the change configuration item 740 of the unidentified type 734 and manually configure the type of the audio output device corresponding to the unidentified type 734.

According to some embodiments, the audio output device list UI 710 may be a list of audio output devices connected to the electronic device 101 but is not limited thereto, and may include audio output devices of which the connections have been released. For example, when currently connected audio output devices and currently non-connected audio output devices are included, the electronic device 101 may differently process colors, shapes, and shades of the device items so as to visually distinguish the currently connected audio output devices and the currently non-connected audio output devices.

Hereinafter, a method of manually controlling the simultaneous output mode is described.

Figure 8:
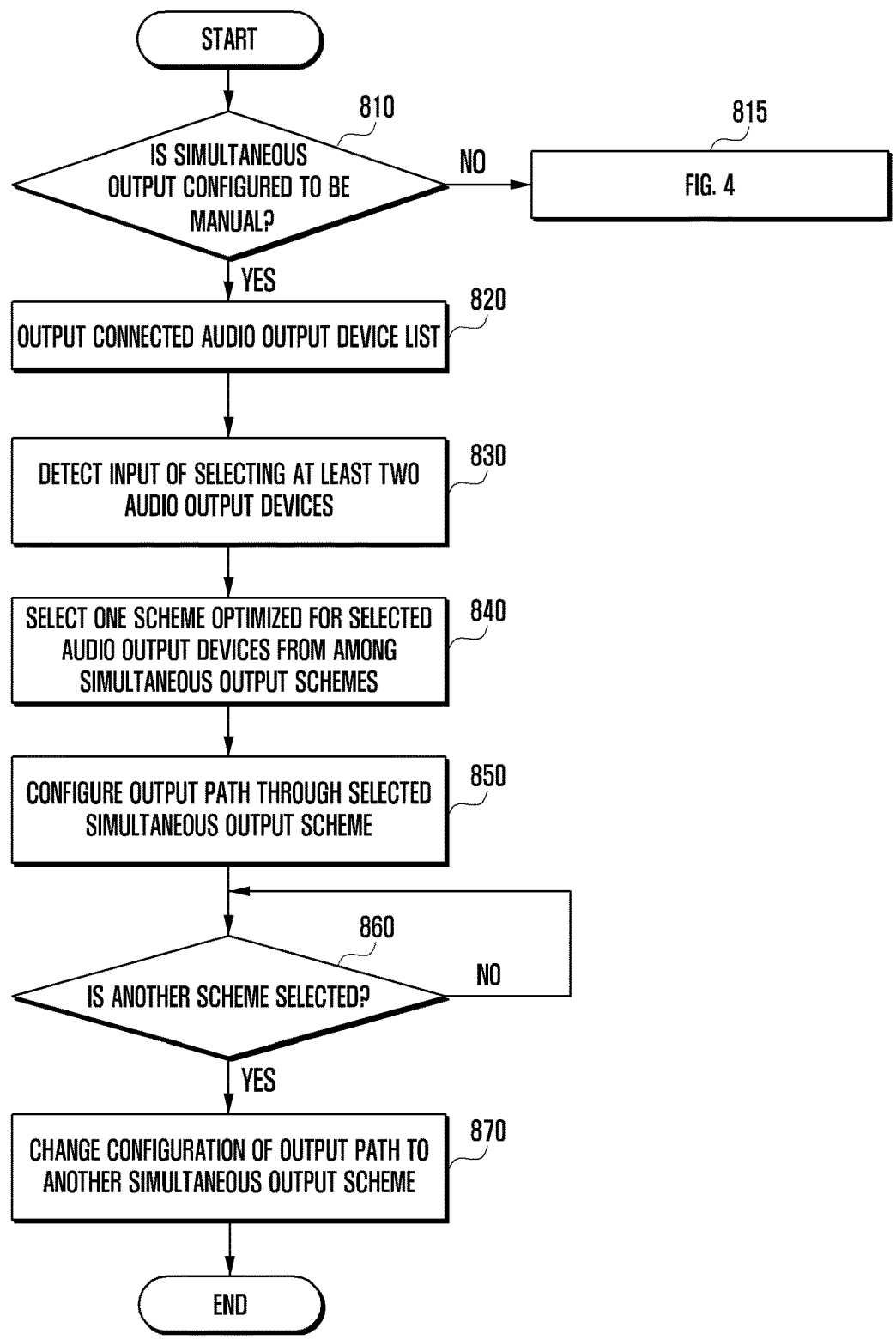
FIG. 8 illustrates a method of manually configuring the audio output mode corresponding to connections of a plurality of audio output devices according to various embodiments.

FIG. 8 illustrates a method of manually configuring the audio output mode corresponding to connections of a plurality of audio output devices according to various embodiments.

Referring to FIG. 8, a processor (for example, the processor 120 of FIG. 1) of the electronic device 101 according to an embodiment may determine whether a simultaneous output scheme of a simultaneous output mode is configured to be manual in connection with the audio output function in operation 810. When the simultaneous output scheme is configured to be automatic rather than manual, the processor 120 may perform the operations of FIG. 4 or the operations of FIG. 5.

When the simultaneous output scheme is configured to be manual, the processor 120 may proceed to operation 820 and output a connected audio output device list UI. For example, the audio output list UI for the manual configuration may additionally provide items for selecting a device list.

In operation 830, the processor 120 may detect an input of selecting at least two audio output devices in the audio output list UI. In operation 840, the processor 120 may select optimized one of the simultaneous output schemes on the basis of the at least two selected audio output devices.

According to an embodiment, the processor 120 may identify device types of the at least two selected audio output devices and display information for recommending or suggesting a simultaneous output device optimized for the identified device types.

According to an embodiment, the processor 120 may detect an output mode configured by the user for a specific audio output device on the basis of an audio output history, select a simultaneous output type preferred by the user, and recommend the simultaneous output type to the user.

According to an embodiment, when there is no identical device type of devices among the at least two audio output devices selected by the user, the processor 120 may provide a guidance for selecting the identical device type of audio output devices to be simultaneously output.

In operation 850, the processor 120 may configure a simultaneous output path in the simultaneous output scheme selected on the basis of the identical device type of audio output devices.

The processor 120 may determine whether a user input of selecting another scheme is detected in operation 860 and, when the user selects another simultaneous output scheme, proceed to operation 870 and change an output path configuration to the other simultaneous output scheme. When a user input of selecting another scheme is not detected, the processor may maintain the output path configured as the simultaneous output scheme selected in operation 850.

Figure 9:
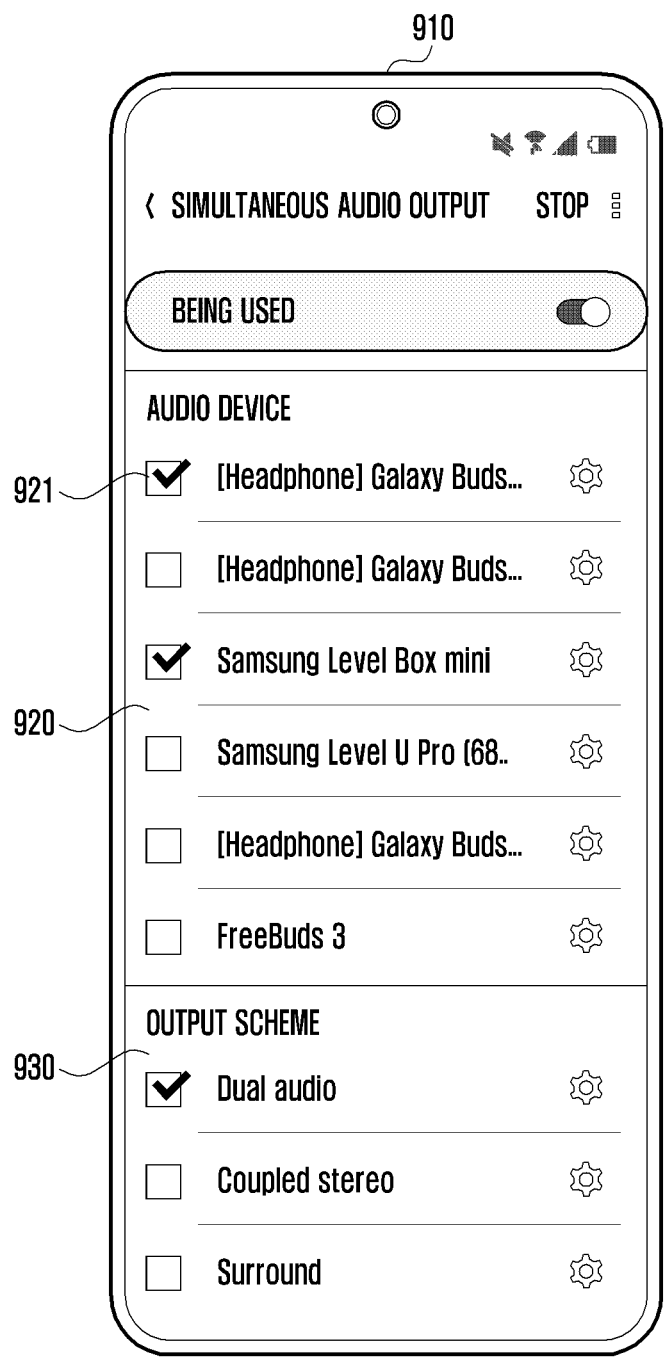
FIG. 9 illustrates a user interface screen related to a manual configuration of the audio output mode according to various embodiments.
Figure 10:
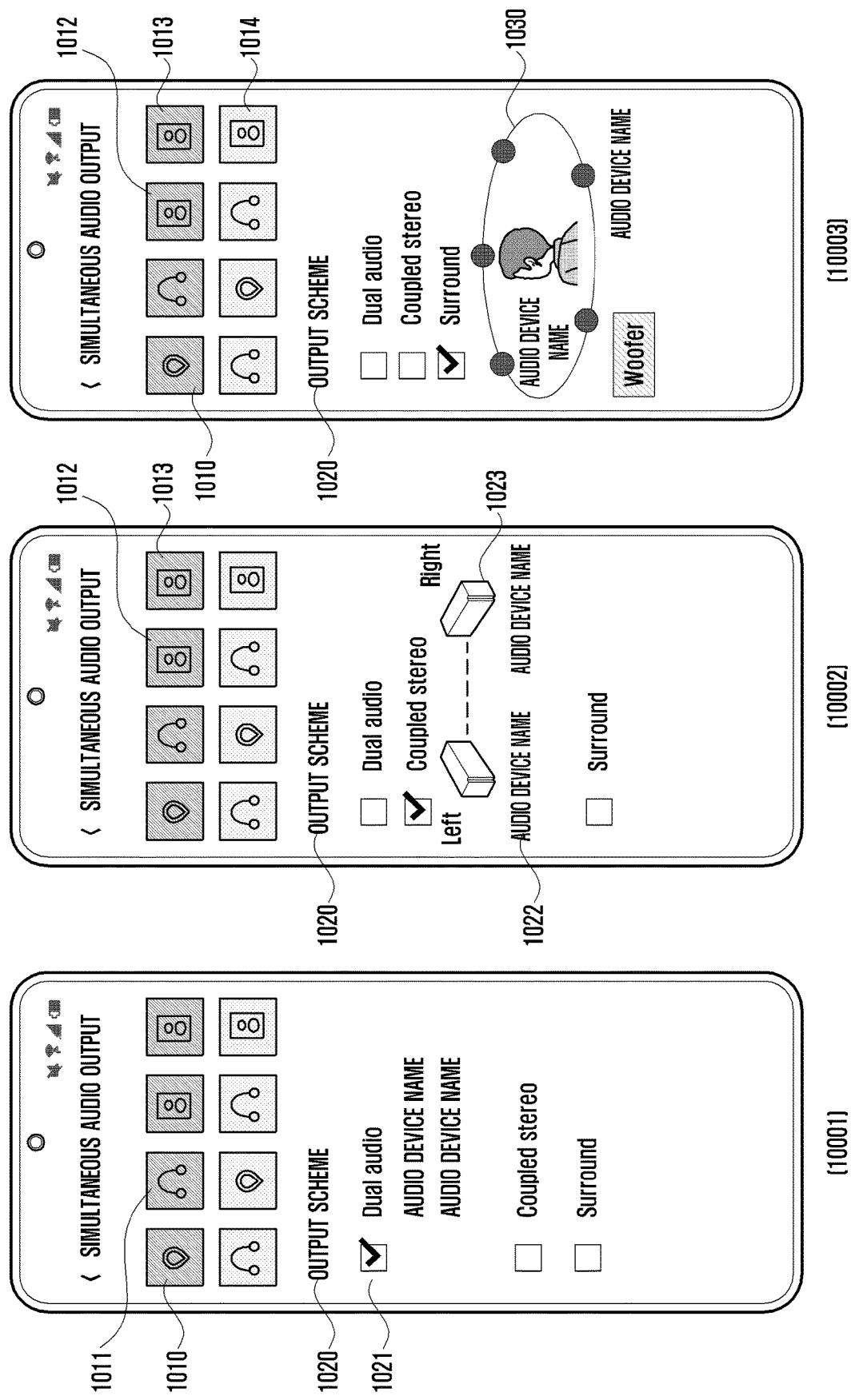
FIG. 10 illustrates user interface screens related to a manual configuration of the audio output mode according to various embodiments.

FIG. 9 and FIG. 10 illustrate user interface screens related to a manual configuration of the audio output mode according to various embodiments.

Referring to FIG. 9 and FIG. 10, according to an embodiment, in connection with the simultaneous output mode, the electronic device 101 may provide a simultaneous output scheme manual configuration UI and support a function of selecting audio output devices by the user and a function of configuring the simultaneous output scheme corresponding to the selected audio output devices.

According to an embodiment, the simultaneous output scheme manual configuration UI may be provided in a list form as illustrated in FIG. 9 but may be provided in an icon form as illustrated in FIG. 10.

For example, the electronic device may display a simultaneous output scheme manual configuration UI 910 including an audio output device list 930 connected to the electronic device and an output scheme list 930 as illustrated in FIG. 9. The list 930 of a plurality of audio output devices and the output scheme list 930 may include a selection check item 921 for selecting each item and a change configuration item for changing information on each item.

The user may select at least two audio output devices by using the selection check item 921 in order to simultaneously output content in the list form illustrated in FIG. 9. The electronic device may select the optimized simultaneous output scheme corresponding to the at least two audio output devices selected by the user and recommend the same. For example, when the user selects two headsets in the audio output list 930, the electronic device may recommend the dual audio scheme, so that the dual audio scheme may be selected from among the output schemes, and checked and displayed. When the simultaneous output is configured as the dual audio scheme, the user may complete the configuration process. Alternatively, when the user desires another simultaneous output mode, not the dual audio scheme and another simultaneous output scheme is selected from among the output schemes and checked, the configuration process may be completed by the selected and checked simultaneous output scheme.

In another example, the electronic device 101 may display a simultaneous output scheme manual configuration UI including icons (for example, 1010, 1011, 1012, 1013, and 1014) related to the audio output devices and an output scheme list 1020 as illustrated in FIG. 10. The output scheme list 1020 may include a selection check item 1021 for selecting each item.

The user may select at least two audio output devices on the basis of a drag and drop gesture for the icon illustrated in FIG. 10. For example, when a first icon 1011 and a second icon 1012 corresponding to the headset type are selected as indicated by reference numeral 10001 or a drag is performed in an output scheme direction on the basis of drag and drop, the dual audio scheme may be selected from among the simultaneous output schemes using the audio output device corresponding to the corresponding first icon 1011 and second icon 1012. Alternatively, the electronic device may guide information that recommends the dual audio scheme. Below the dual audio scheme of the electronic device, a name of the audio output device selected by the user may be displayed.

In another example, when a third icon 1012 and a fourth icon 1013 corresponding the speaker type are selected as indicated by reference numeral 10002, the coupled stereo scheme using two speaker devices may be selected from among the simultaneous output schemes. In this case, when the user drags the third icon 1012 to a left location and the fourth icon 1013 to a right location, a device of a channel corresponding to each location may be configured and simultaneous output may be performed. The electronic device 101 may display a device name 1022 and a device icon 1023 for designating/identifying the audio output device at the location corresponding to the channel configuration in the coupled stereo scheme.

In another example, when a third icon 1012, a fourth icon 1013, and a fifth icon 1014 corresponding to the speaker type are selected as indicated by reference numeral 10003, the surround scheme using three speaker devices may be selected from among the simultaneous output schemes. The electronic device 101 may display a device name and location icon 1030 for designating/identifying the audio output device at the location corresponding to the channel configuration in the surround scheme.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

The invention claimed is:

1. An electronic device comprising:
an audio interface;
a communication module;
a processor; and
a memory operatively connected to the processor,
wherein the memory is configured to store instructions causing the processor to, when executed:
receive a request for a connection with a second audio output device through at least one of the audio interface and the communication module during a connection with a first audio output device;
identify types of the first audio output device and the second audio output device, and responsive to determining that the types are identical device types, automatically select one simultaneous output scheme corresponding to the first audio output device and the second audio output device from among various simultaneous output schemes, configure an output path according to the selected simultaneous output scheme, and reproduce audio data; and
repeat an operation of configuring the output path responsive to a third audio output device being connected through at least one of the audio interface and the communication module.

2. The electronic device of claim 1, wherein the memory is configured to further store instructions causing the processor to select a first simultaneous output scheme responsive to determining that the identical device types are a first type, and select a second simultaneous output type responsive to determining that the identical device types are a second type.

3. The electronic device of claim 2, wherein, responsive to determining that the first type is a headset type, the first simultaneous output scheme is a dual audio output scheme of copying audio data and transferring or reproducing the audio data to each of the first audio output device and the second audio output device, and
wherein the second simultaneous output scheme is a scheme of dividing audio data by channels and transferring or reproducing channel-divided signals to the first audio output device and the second audio output device.

4. The electronic device of claim 2, wherein, responsive to determining that the second type is a speaker type, the memory is configured to further store instructions causing the processor to:
select a coupled stereo output scheme as the second simultaneous output scheme responsive to determining that a number of speaker devices connected to the electronic device is two; and
select a surround output scheme as the second simultaneous output scheme responsive to determining that a number of speaker devices connected to the electronic device is larger than two.

5. The electronic device of claim 1, wherein the memory is configured to further store instructions causing the processor to control volume levels of the first audio output device and the second audio output device to be equal to each other.

6. The electronic device of claim 1, wherein the memory is configured to further store instructions causing the processor to, responsive to determining that types of the first audio output device, the second audio output device, or the third audio output device are not equal to each other, configure an output path to output the audio data through a last connected audio output device among the audio output devices connected to the electronic device.

7. The electronic device of claim 1, further comprising a display,
wherein the memory is configured to further store instructions causing the processor to configure a simultaneous output mode responsive to determining that the second audio output device is connected and display a user interface supporting configuration maintenance or release on the display responsive to determining that a request for entering a simultaneous output function supporting option menu is made or a request for reproducing content is made, or in a state in which a simultaneous output function is executed.

8. The electronic device of claim 7, wherein the memory is configured to further store instructions causing the processor to, responsive to determining that the simultaneous output mode is configured to be automatic, display simultaneous output mode configuration guide information on the display in a state in which the simultaneous output mode is released responsive to determining that the second audio output device is connected.

9. The electronic device of claim 7, wherein the memory is configured to further store instructions causing the processor to:
responsive to determining that the simultaneous output mode is configured to be manual, display an audio output device list connected to the electronic device on the display in response to a request for the connection with the second audio output device;
detect a user input of selecting at least two audio output devices from the audio output device list; and
display information automatically selecting or recommending a simultaneous output scheme suitable for at least two audio output devices selected by the user input.

10. A method of configuring an audio output mode by an electronic device, the method comprising:
receiving a request for a connection with a second audio output device through at least one of the audio interface and the communication module during a connection with a first audio output device;
identifying types of the first audio output device and the second audio output device; and
responsive to determining that the types of the first audio output device and the second audio output device are equal to each other, automatically selecting one simultaneous output scheme corresponding to the first audio output device and the second audio output device from among various simultaneous output schemes, configuring an output path according to the selected simultaneous output scheme, and reproducing audio data,
wherein the configuring of the output path comprises repeating the configuring of the output path responsive to a third audio output device being connected through at least one of the audio interface and the communication module.

11. The method of claim 10, wherein the identifying of the types comprises identifying the types, based on a device identifier and a device name included in profile information of each audio output device.

12. The method of claim 10, wherein the automatically selecting of the simultaneous output scheme comprises selecting a first simultaneous output scheme responsive to determining that the identical device types are a first type and selecting a second simultaneous output type iresponsive to determining that the identical device types are a second type.

13. The method of claim 12, wherein, responsive to determining that the first type is a headset type, the first simultaneous output scheme is a dual audio output scheme of copying audio data and transferring or reproducing the audio data to each of the first audio output device and the second audio output device, and wherein the second simultaneous output scheme is a scheme of dividing audio data by channels and transferring or reproducing channel-divided signals to the first audio output device and the second audio output device.

14. The method of claim 12, wherein, responsive to determining that the second type is a speaker type, the second simultaneous output scheme is a coupled stereo output scheme in case that a number of speaker devices connected to the electronic device is two, and the second simultaneous output scheme is a surround output scheme responsive to determining that a number of speaker devices connected to the electronic device is larger than two.

15. The method of claim 10, wherein the configuring of the output path further comprises configuring the output path such that volume levels of the first audio output device and the second audio output device are equal to each other responsive to determining that a request for reproducing content is made.

\* \* \* \* \*